United States Patent

Thompson et al.

[11] Patent Number: 5,301,999
[45] Date of Patent: Apr. 12, 1994

[54] LIGHTWEIGHT STOWABLE SUNSHADE FOR CHILD'S CAR SEAT

[76] Inventors: Marion L. Thompson; Irene L. Thompson, both of 6871 Hwy. 19, Waunakee, Wis. 53597

[21] Appl. No.: 26,510
[22] Filed: Mar. 3, 1993
[51] Int. Cl.⁵ ............................................. A47C 7/66
[52] U.S. Cl. .............................. 297/184.13; 297/184.15; 248/284
[58] Field of Search .................... 248/284; 297/184.13, 297/184.15, 184.16

[56] References Cited

U.S. PATENT DOCUMENTS

| | | | |
|---|---|---|---|
| 526,382 | 9/1894 | Conkling | 248/284 X |
| 564,454 | 7/1896 | Ryan | 248/284 X |
| 1,266,367 | 5/1918 | Wilson | 248/284 X |
| 3,243,230 | 3/1966 | Otto | 297/184.15 |
| 4,293,162 | 10/1981 | Pap et al. | 297/184.15 |
| 4,314,727 | 2/1982 | Potts | 297/184 |
| 4,583,780 | 4/1986 | Finn | 297/184 |
| 4,781,411 | 11/1988 | Kolb | 297/184 |
| 4,784,433 | 11/1988 | Purnell-Ayres | 297/184 |
| 4,813,739 | 3/1989 | Miller | 297/184 |
| 4,823,822 | 4/1989 | Maya | 135/87 |
| 4,858,990 | 8/1989 | Combs-Rose et al. | 297/184 |
| 4,865,380 | 9/1989 | Heitzman-Powell et al. | 297/184 |
| 4,871,141 | 10/1989 | Chen | 297/184.16 X |
| 4,902,026 | 2/1990 | Maldonado | 280/30 |
| 4,911,498 | 3/1990 | Becher et al. | 297/184 |
| 4,923,249 | 5/1990 | Mattox | 297/184 |
| 4,978,166 | 12/1990 | James | 297/184 |
| 5,000,210 | 3/1991 | Worthington, Jr. | 297/184.15 X |
| 5,007,674 | 4/1991 | Franc | 297/184 |
| 5,067,770 | 11/1991 | Hassell, Jr. | 297/184 |
| 5,083,837 | 1/1992 | Roach | 297/184 |
| 5,096,257 | 3/1992 | Clark | 297/184.15 |

Primary Examiner—Kenneth J. Dorner
Assistant Examiner—Milton Nelson, Jr.
Attorney, Agent, or Firm—Lathrop & Clark

[57] ABSTRACT

A mounting bracket is rigidly mounted to the side of a child's car seat. An angle bracket has a first flange rotatably engaged with the mounting bracket and has a second flange which extends at approximately 90 degrees to the first flange. A first arm is rotatably mounted to the mounting bracket second flange. A second arm is rotatably mounted to the first arm and a third arm is rotatably mounted to the second arm, thus forming an extended linkage which supports a lightweight sunshield above and to one side of the car seat to shield a child using the car seat from the rays of the sun. The sunshield is constructed of a tubular support frame which is constrained within a fire resistant cloth cover. The tubular support frame is elastically constrained within a pocket formed by the two sides of the cover. The cover may have pictures printed thereon to entertain the child being shielded from the sun's rays. The ends of the tubular support pass through holes in opposed sides of a shade support bracket. The support bracket is rotatably linked to the uppermost arm in the extended linkage of the sunshade assembly. The elements of the assembly are connected at rotatable joints which may be clamped by adjustment of hand nuts to fix the sun shield in a desired position.

6 Claims, 4 Drawing Sheets

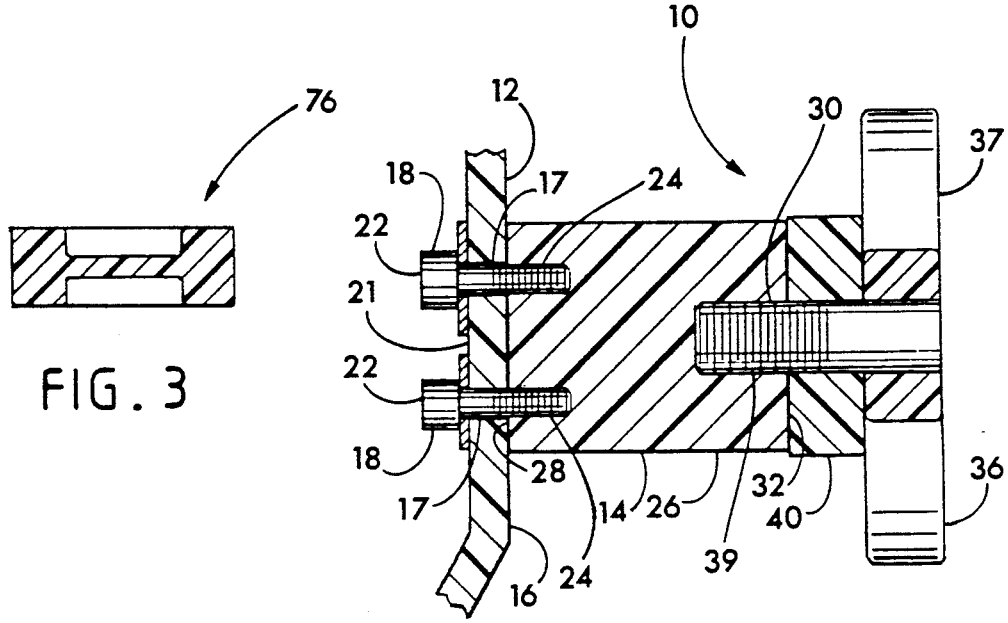
FIG. 3
FIG. 4
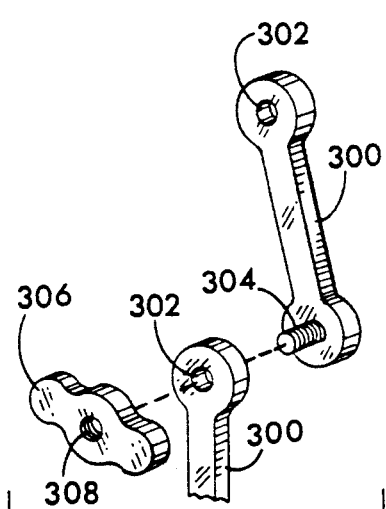
FIG. 5
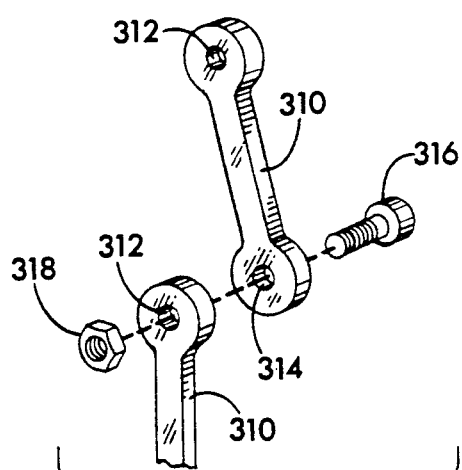
FIG. 6

LIGHTWEIGHT STOWABLE SUNSHADE FOR CHILD'S CAR SEAT

FIELD OF THE INVENTION

The present invention relates to sun visors, and more particularly pertains to sun visors for attachment to children's car seats.

BACKGROUND OF THE INVENTION

When traveling by automobile with small children there are many safety related precautions that should be taken. Restraining a child using an especially designed car seat is the most important and is required by law in many states. There are other safety devices, not currently mandated by any government agency which, nevertheless, those to whom the care of young children has been entrusted will wish to take advantage of. One important safety consideration is providing a shade to protect a young child from the harmful effects of the sun's radiant energy. The developing eyes of children are unusually susceptible to potential permanent damage from repeated exposure to the sun. In addition, the sun's ultraviolet rays can cause sunburns to sensitive young skin. Sunburn has been implicated as a cause of skin cancer in later life.

One type of sunshade consists of a blanket or other type of curtain positioned over one or more of the car's windows. However, placing shades over the car's windows reduces driver visibility and negatively impacts the safety of the car's occupants. Further, the sun will often shine through the front or back windows of a car which cannot be practically covered while the car is in motion.

Another known approach to shielding a child in a car seat from the harmful effects of the sun's rays is to position a shield to surround the child's head and/or his upper body. These shields, while effective at blocking the sun, can stifle air circulation producing an uncomfortable environment for the child. Surrounding sunshields may also result in an environment for the small child which has reduced visual and auditory stimulus as an all-encompassing sunshield blocks both vision and hearing. An environment of reduced stimulus is thought by some to adversely affect a child's development.

Yet another type of sun visor for a child's car seat adjustably positions a sunshield device between the sun and the child. However, these devices often contain metal components in the shield and are uniquely adapted to mount to the back of a child's car seat. Because of the mounting method of these car seats, they are not broadly adaptable to a range of car seats. Further, because this type of support passes over the child's head and because the shield contains metal, a hazard may be presented in a crash situation if the shield is driven downwards toward the child.

Another problem not addressed by known child car seat sunshades is that often a child's car seat will be designed to function as child tote in which case it will be desirable that the sunshades be readily stowable so as to not interfere with the function of the car seat as a child tote.

What is needed is a lightweight, adjustably positionable sunshade for a child car seat which mounts to the side of the seat, is stowable, and which allows stimulation of the child's visual environment.

SUMMARY OF THE INVENTION

The sunshade for a child's car seat of this invention has a mounting bracket which rigidly mounts to the side of a child's car seat. An angle bracket having a first flange is rotatably engaged with the mounting bracket and has a second flange which extends at approximately 90 degrees to the first flange. The sunshade has a first arm rotatably mounted to the second flange of the mounting bracket. A second arm is rotatably mounted to the first arm, and a third arm is rotatably mounted to the second arm, thus forming an extended linkage which supports a lightweight sunshield above and to one side of the car seat to shield a child using the car seat from the rays of the sun.

The rotatable joints of the linkage are adjustable to prevent or allow rotation of the connected parts. The linkage may thus be adjusted to position the sunshield to protect an occupant of the car seat with minimal effort. The lightweight sunshield is constructed of a tubular support frame which is constrained within a fire-resistant cloth cover. The tube is elastically constrained within a pocket formed by the two sides of the cover. The cover may have pictures printed thereon to entertain the child being shielded from the sun's rays. The ends of the tubular support pass through holes in opposed sides of a sunshield support bracket. The sunshield support bracket is rotatably linked to the uppermost arm in the extended linkage of the sunshade assembly.

The rotatable and adjustable joints between the mounting bracket, the angle brackets and the arms are formed by T-bolts which engage with threaded holes in the arms and brackets. The T-bolt clamps an arm or bracket against the arm or bracket in which the threaded pin is located thus forming a joint with a single degree of freedom. Further, the compression supplied by the hand nut forces one component against another to frictionally engage them to prevent rotation under their own weight. Thus, the sunshade by means of the rotatably and frictionally engagable joints may readily position the sunshield for optimum performance over the occupant of the car seat.

It is an object of the present invention to provide a sun visor for a child's car seat which is adjustably positionable. It is a further object of the present invention to provide a sun visor for a child's car seat which is adapted for attachment to the side of a child's car seat.

It is another object of the present invention to provide a sun visor for a child's car seat which is lightweight.

It is also an object of the present invention to provide a sun visor for a child's car seat which is adaptable for use with brightly-colored materials for the stimulation of a child.

It is still further object of the present invention to provide a sun visor for a child's car seat which is stowable to improve the transportability of the car seat when used as a child tote.

Further objects, features, and advantages of the invention will be apparent from the following detailed description when taken in conjunction with the accompanying drawings

BRIEF DESCRIPTION OF THE DRAWINGS

In the drawings:

FIG. 3 is a cross-sectional view of the arm of FIG. 2 taken along section line 3—3.

FIG. 4 is a cross-sectional view of the assembly of FIG. 1 taken along section line 4—4 showing the attachment of the assembly to the car seat.

FIG. 5 is an exploded isometric view of an alternative embodiment joint for the sunshade assembly of this invention.

FIG. 6 is an exploded isometric view of another alternative embodiment joint for the sunshade assembly of this invention.

DESCRIPTION OF THE PREFERRED EMBODIMENT

Figure 1:
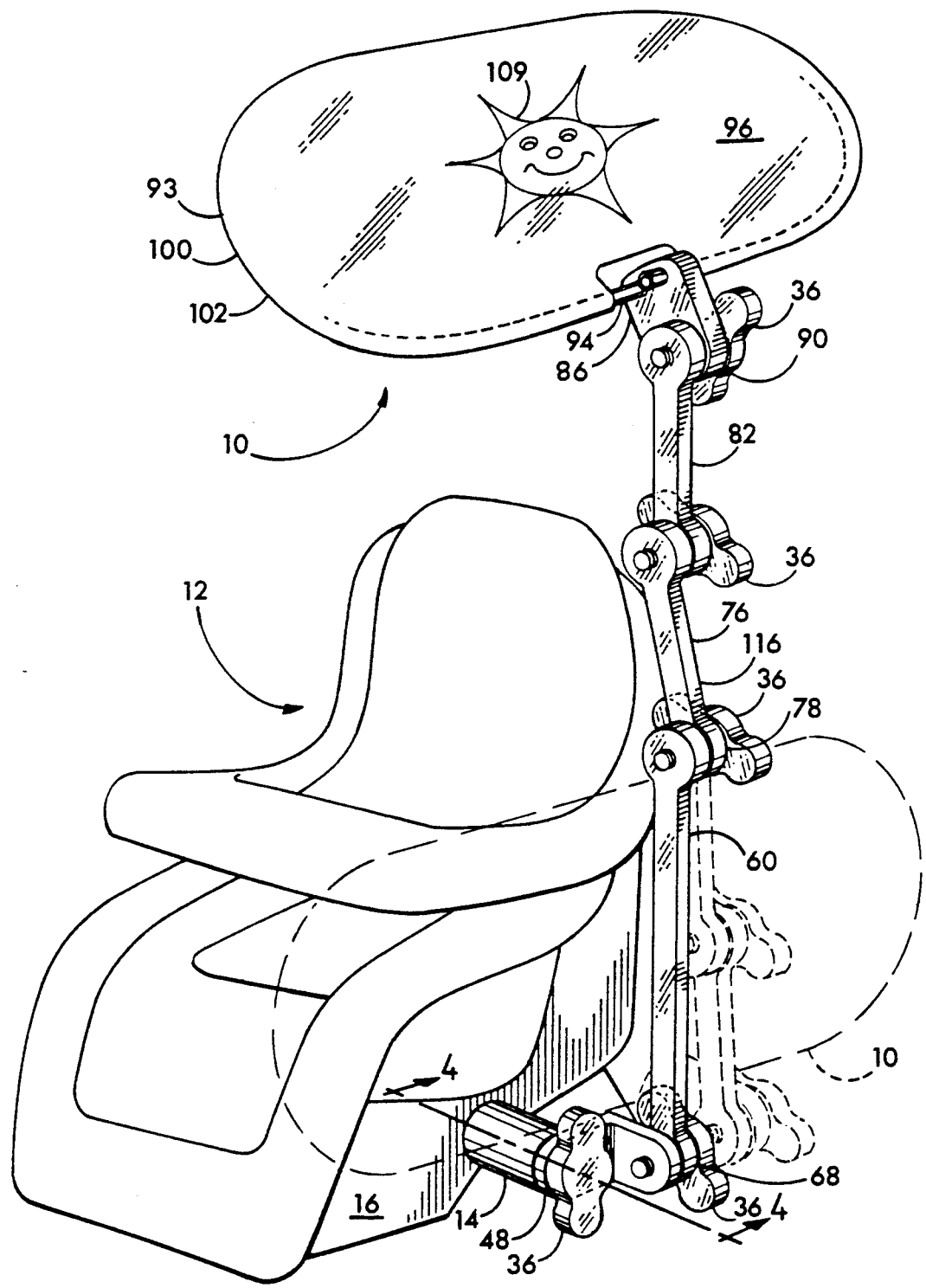
FIG. 1 is a front side perspective view of the sunshade assembly of this invention as mounted on a typical child's car seat, with the stowed position shown in phantom.

Referring more particularly to FIGS. 1-7 wherein like numbers refer to similar parts, a sunshade assembly 10 is shown in FIG. 1. The sunshade assembly 10 has a mounting bracket 14 which mounts to a child's car seat 12 and an angle bracket 40 which extends from the mounting bracket and which supports three positionable arms 60, 76, 82 which are fixable by a number of hand-tightened T-bolts 36 to locate a lightweight sunshield 92 formed of fabric and plastic tubing to shade a child from the direct rays of the sun.

Figure 2:
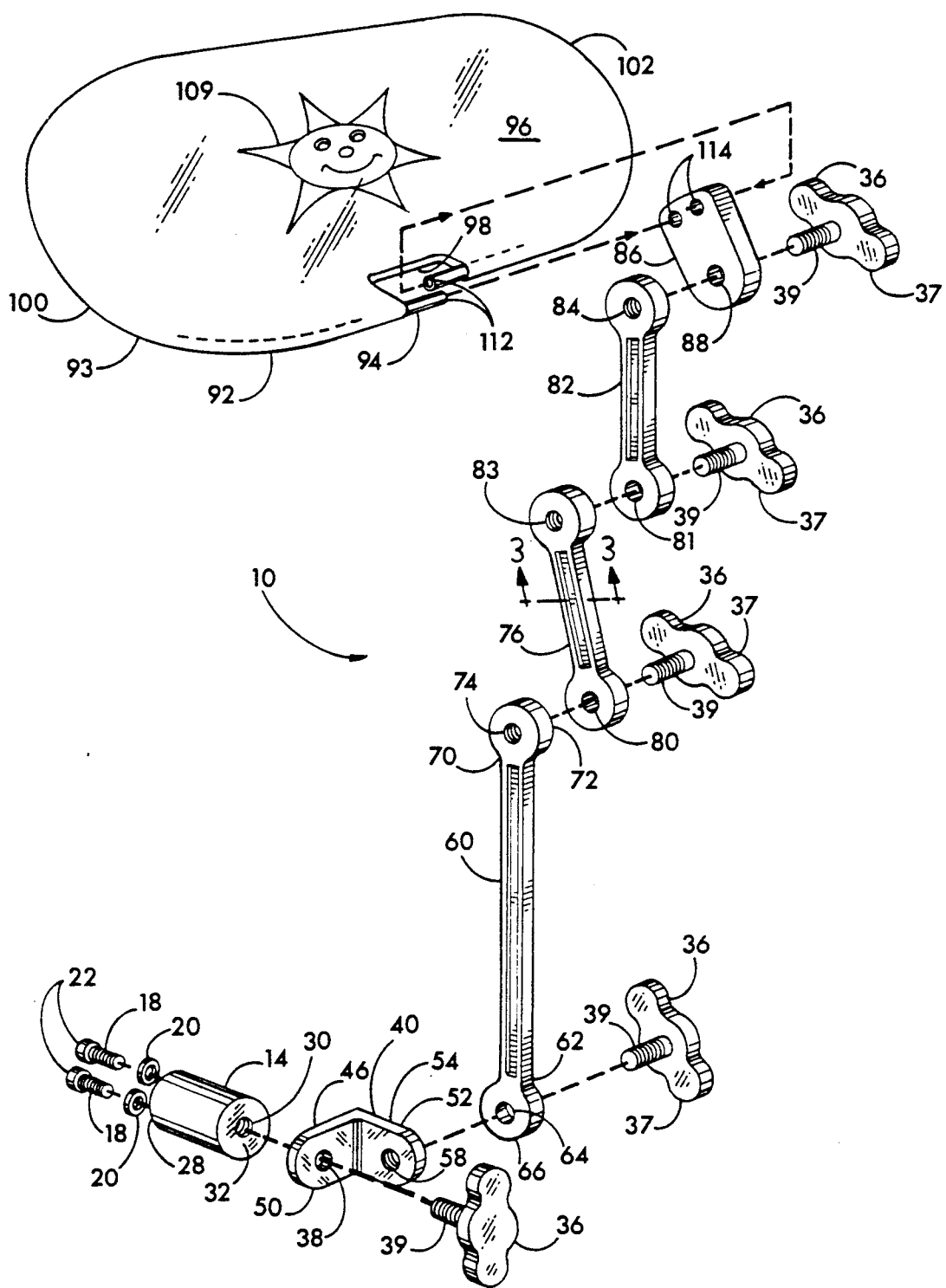
FIG. 2 is an exploded isometric view of the sunshade assembly of FIG. 1.

The sunshade assembly 10 is mounted to a child's car seat 12, as shown in FIG. 4, by a side mounting bracket 14, best shown in FIG. 2. The mounting bracket 14 is attached to the side wall 16 of the car seat 12. If the sunshade assembly 10 is manufactured and sold together with the car seat 12 the mounting bracket 14 may be formed as an integral part of the car seat 12.

In one preferred embodiment, the sunshade assembly 10 is adapted for installation by the consumer as a modification to an existing car seat. The bracket 14 is conveniently mounted to the side of the car seat 12 by two mounting screws 18 and washers 20 which extend through the side wall 16 and secure the mounting bracket to the seat wall 16. The screws 18 pass through the side wall 16 through holes 17 which may be readily drilled by the consumer in the side 16 of the car seat 12. To install the sun shade assembly 10 the washers 20 are placed on the inside surface 21 of the side wall 16 where they can distribute the loads imposed on the side by the screw heads 22. The screws 18 preferably engage with blind threaded holes 24 in the body 26 of the bracket 14. Alternatively, the side face 28 of the mounting bracket 14 may be adhesively attached to the side wall 16 of the car seat 12 by an adhesive or structural foam tape.

In order to maximize the functionality of the sunshade assembly 10 it may be desirable to supply paper templates which indicate preferred locations of the mounting brackets 14 for the sides of various types of car seats. On the other hand, the positioning of the sunshade 10 may be left to the discretion of the consumer who may be given general directions for the placement of the mounting bracket 14.

The mounting bracket 14 protrudes sidewardly from the car seat and serves to space the adjustable linkage 116 from portions of the car seat which may protrude out beyond the side wall 16.

The sunshield 92 is positionably connected to the mounting bracket 14 through a series of brackets 40, 86 and arms 60, 76, 82. The elements of the assembly 10 are fastened together by five T-bolts 36. Each T-bolt has a threaded shaft 39 and a graspable elongated head 37.

The mounting bracket 14 has a blind hole 30 which opens on the bracket exterior face. The shaft 39 of a T-bolt 36 extends through a mounting hole 38 in an angle bracket 40 and engages with the mounting bracket hole 30. The angle bracket 40 is clamped to the exterior face 32 of the mounting bracket 14 by the T-bolt head 37.

When the T-bolt 36 is tightened the clamped interior face 46 of the angle bracket 40 is forced against the exterior face 32 of the mounting bracket 14.

Because the frictional force between two surfaces is dependent upon the forces holding the surfaces 32, 46 in contact and the co-efficient of friction of the surface, tightening the T-bolt 36 increases the frictional engagement of the angle bracket 40 with the mounting bracket 14. Thus, the joint formed by the opposed surfaces 32, 46 together with the T-bolt 36 and the mounting hole 38 results in a rotational joint 48 which also functions as a clutch for preventing the excessive or free motion of the joint. In particular, the angle bracket 40 may be caused to rotate about the shaft 39 of the T-bolt 36 by application of hand force while at the same time the joint will be clamped against rotation when the hand force is removed, because the weight of the sunshade assembly 10 is insufficient to overcome the frictional forces between the angle bracket 40 and the mounting bracket 14.

Further, the sliding friction may be adjusted by tightening or loosening the T-bolt 36 so that the joint 48 may be loosened for ready adjustment, and clamped when the desired position is obtained. Because the joints of the assembly 10 allow movement while they are engaged, the various joints of the assembly do not have to be sequentially loosened, positioned, and clamped but rather the sunshade may as a unit be properly positioned and will retain that position. Fine positioning of the sunshade assembly 10 may then be accomplished by loosening individual joints, rotating that joint, and then clamping by means of the T-bolts 36.

The angle bracket 40 has a first flange 50 through which the mounting hole 38 extends, and a second flange 52 through which a threaded hole 58 extends. The angle bracket engages with a positionable arm 60 shown in FIG. 2. The arm has a first end 62 which has an unthreaded hole 64 through which a T-bolt 36 extends to engage the threaded hole of the angle bracket 40 to clamp a face 66 of the first end 62 of the arm 60 against the face 54 of the second flange 52 of the angle bracket 40. Thus the arm 60 is joined to the angle bracket 40 by a joint 68 which is similar to the joint 48 and which allows rotation of the arm about the T-bolt 36 by adjustment of the T-bolt head 37 to apply a frictional clamping force between the arm 60 and the bracket 40. An exemplary arm 60 is approximately 12 inches long, although the length will depend on the type of car seat 12 with which the sunshade assembly 10 is utilized.

The arm 60 has a second end 70 which has an engaging face 72 and a threaded through hole 74. An arm 76, preferably shorter than the arm 60, engages with the arm 60 as shown in FIG. 1. The two arms 60, 76, are connected by a T-bolt 36 in a positionable joint 78. The engagement or joint 78 between the short arm 76 and the long arm 60 is similar to the joints formed between the long arm 60 and the angle bracket 40 and between the angle bracket 40 and the mounting bracket 14. The T-bolt shaft 39 passes through the unthreaded mounting hole 80 on the short arm 76 and the head 37 is rotated to clamp the short arm 76 to the long arm 60.

The short arm 76 in one exemplary sunshade assembly 10 is approximately five inches long. The short arm 76 is engaged with a similar or identical short arm 82 shown in FIG. 1. A T-bolt 36 extends through an unthreaded hole 81 in the second short arm 82 and engages with a threaded hole 83 in the first short arm. The second short arm 82 has a threaded hole 84 through which a T-bolt 36 extends to engage the short arm 82 with a sunshield bracket 86.

The sunshield bracket 86 has a large mounting hole 88 which mounts over the threaded shaft 39 of the T-bolt 36 and is clamped in rotating relationship to the second short arm 82 by the T-bolt to form a rotating joint 90 which allows pivoting of the sunshield 92.

The sunshield 92 is an opaque member which serves to block undesired light from reaching the eyes and skin of an occupant of the child car seat. The sunshield 92 is constructed of a lightweight flexible plastic tube 94 which is retained within a cloth covering 93. The covering 93 has an upper layer 96 and a lower layer 98 which are joined together at a peripheral edge 100 forming a bag 102 best shown in FIG. 2 which contains the tube 94. The tube 94 is elastically deformed to fit within the bag 102. The constrained tube 94 determines the shape of the sunshield 92 and keeps the upper layer 96 and lower layer 94 taunt.

The cloth from which the bag 102 is constructed is preferably treated with a flame resistant material or constructed of an inherently flame resistant material such as TEFLON ® cloth. Further, the upper layer 96 and the lower layer 94 may have suitable indicia or pictures printed thereon which serve two purposes. A picture (not shown) may be placed on the lower layer to visually stimulate or entertain a child 106 while occupying the car seat 12. The indicia 109 on the upper layer 96 serve to increase the visual attractiveness of the sunshade assembly 10.

The sunshield 92 is mounted to the bracket 86 by passing the tube ends 112 of the tube 94 through tube retention holes 114 in the sunshield bracket 86. The tube ends 112 enter on opposite sides of the bracket 86 and are resiliently gripped by a force fit with the holes 114. Thus the holes allow the rotation of the sunshield 94 about the mounting bracket 86 but clamp the sunshield 92 against free rotation, thus allowing the manual positioning of the sunshield 92 with respect to the bracket 86.

Because the sunshade assembly 10 is mounted to the side 16 of a child car seat 12 and employs a single angle bracket 40, the sunshade assembly joints which join the angle bracket 40 to the arms 60, 76, 82 and the shield bracket 86 are all rotatable in closely spaced parallel planes. The angle bracket 40, on the other hand, is clamped in rotating relation to the mounting bracket 14 and thus rotates in a plane perpendicular to the planes of the extending linkage 116 formed by the arms 60, 76, 82.

Two advantages stem from the planar arrangement of the joints of the sunshade assembly 10. First, in a crash type situation where the forward or rearward acceleration is experienced, only the joint 48 between the angle bracket 40 and the mounting bracket 14 is free to rotate. Thus the sunshade assembly tends to rotate frontwardly and away from the child rather than sidewardly into the child. Further, the placement of all the extended linkage 116 joints in the same parallel planes allows the sunshade to be collapsed for ready storage adjacent to the car seat as illustrated in phantom view in FIG. 1.

As illustrated in FIG. 1, the arms in the extended linkage 116 are progressively stacked so that the two shorter arms 76, 982 may be double back along the longer arm 60 bringing the sunshield 92 adjacent to the angle bracket 40 thus stowing the sunshield to ease transportion of the car seat or stow the sunshield assembly 10 at night and on cloudy days when the sunshield is not required.

The driver or other passenger may effectively shield a child utilizing the sunshade assembly of this invention, by extending or retracting the linkage 116 to place the opaque sunshield at an appropriate level above and frontwardly of the child. The linkage may be rotated about the mounting bracket 14 to bring the sunshield forward. The frictional engagement of the elements of the assembly 10 is such that the elements will move under the force of hand pressure, but will remain in position under the weight loads of the assembly itself. The parallel axes of the arm joints facilitates easy upward and downward movement of the sunshield.

Figure 7:
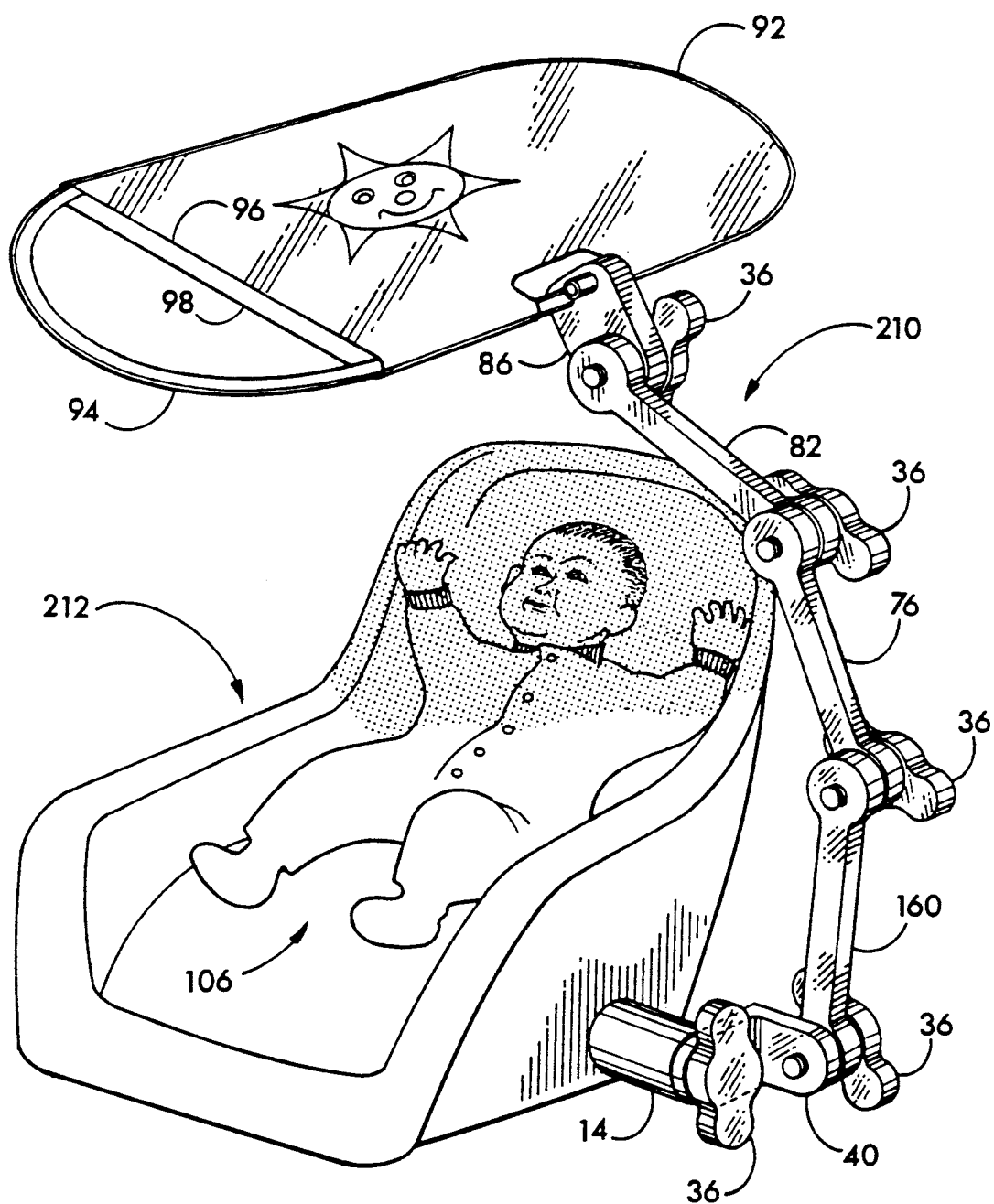
FIG. 7 is an isometric view of an alternative embodiment of the sunshade assembly of this invention shown mounted to a car seat for younger children.

An alternate embodiment of the sunshade assembly 210 of the present invention is shown in FIG. 7. The sunshade assembly 210 may be employed with an infant car seat 212 which is suited for carrying a small or younger child. The alternative assembly 210 is identical to the sunshade assembly 10 described except that all three arms 160, 76, 82 are of equal length, to position the sunshield 92 in closer proximity to the child 106.

Alternative joint structure is disclosed in FIGS. 5 and 6. The alternative assembly of FIG. 5 employes arms 300 which have an unthreaded hole 302 at one end and a protruding threaded pin 304 at the other. The pin 304 of one arm 300 extends through the unthreaded hole 302 of another arm and is secured by a finger nut 306 which has a threaded hole 308. The nut 306 may be easily grasped by the user and adjusted to tighten or loosen the joint.

The alternative assembly of FIG. 6 employes arms 310 which have two unthreaded holes 312, 314, one at each end of the arm. A bolt 316 extends through the unthreaded holes of two arms, and is fastened with a threaded nut 318, which may be a hex nut as shown or may be a finger nut similar to that shown in FIG. 5.

The components of the sunshield assembly 10 are preferably injection molded with a minimum number of parts. Therefore, the T-bolts 36 are preferably identical and further, the short arms 76 and 82 are preferably identical.

An exemplary sunshield may be 18 inches by 12 inches or it may be circular or other shape and have varying dimensions.

It should be understood that wherein three arms linked together are shown, two, four, or more linked arms could be used.

It should also be understood that wherein the angle bracket is shown as having two flanges at approximately 90 degrees to each other, the angle could be varied.

It is understood that the invention is not confined to the particular construction and arrangement of parts herein illustrated and described, but embraces such modified forms thereof as come within the scope of the following claims.

We claim:

1. A sunshade assembly for positionable mounting to a child's car seat, comprising:
   a) a mounting bracket adapted for rigidly mounting to the side of a child's car seat;
   b) an angle bracket having a first flange rotatably mounted to the mounting bracket for selected positioning, and a second flange extending approximately 90 degrees to the first flange;
   c) a first arm rotatably mounted for selected positioning to the second flange of the mounting bracket, wherein the first arm is rotatable in a first plane defined with respect to the second flange;
   d) at least one second arm rotatably mounted for selected positioning to the first arm and rotatable in a plane substantially parallel to the first plane;
   e) a support bracket rotatably mounted for selected positioning to said second arm and rotatable in a plane substantially parallel to the first plane;
   f) a lightweight sunshield having a tubular support frame rotatably mounted to the support bracket for selected positioning, wherein a cover extends across the frame to serve to positionably block sunlight directed at the car seat's passenger.

2. The sunshade of claim 1 further comprising a third arm rotatably mounted between the second arm and the support bracket, the third arm being rotatable in the plane of rotation of the first and second arms.

3. The sunshade assembly of claim 1 wherein the arms are connected to one another by a threaded pin which extends through a hole in the first arm and a hole in the second arm, and further comprising a nut which allows the clamping of the two arms together to obtain a desired resistance to rotation between the arms.

4. A stowable sunshade assembly for a child's car seat comprising:
   a) a mounting bracket which rigidly mounts to a child's car seat;
   b) an angle bracket having a first flange rotatably mounted to the mounting bracket for selected positioning, and a second flange extending approximately 90 degrees to the first flange;
   c) a sunshield member which blocks undesired light from the eyes of an occupant of said car seat when interposed between a source of light and said occupant; and
   d) at least a first and second interconnected arm which extend between the angle bracket and the sunshield member, wherein said first and second arms are connected at a joint, the joint being formed by engaged portions of the first and second arms, and wherein the joint permits rotation of at least one of said arms about a first axis, and wherein the sunshield member is connected to the second arm at a second joint which permits rotation about a second axis parallel to the first axis, and wherein the first arm is mounted to the angle bracket and the angle bracket is rotatable about an axis substantially perpendicular to said first axis, such that the member may be selectably positioned with respect to the car seat to block undesired light from a particular direction.

5. The sunshade assembly of claim 4 wherein each joint includes a member which is rotatable to clamp the engaged portions of said joint to restrict rotation about said joint.

6. The sunshade assembly of claim 4 wherein the first arm is rotatably mounted to the angle bracket second flange.

* * * * *